April 3, 1962

I. W. STEVENSON 3,028,503

CONTROL DEVICES FOR AUTOMATICALLY
CONTROLLING PHYSICAL VARIABLES

Filed Nov. 18, 1958

INVENTOR
IAN W. STEVENSON
BY
Moore & Hall
ATTORNEY

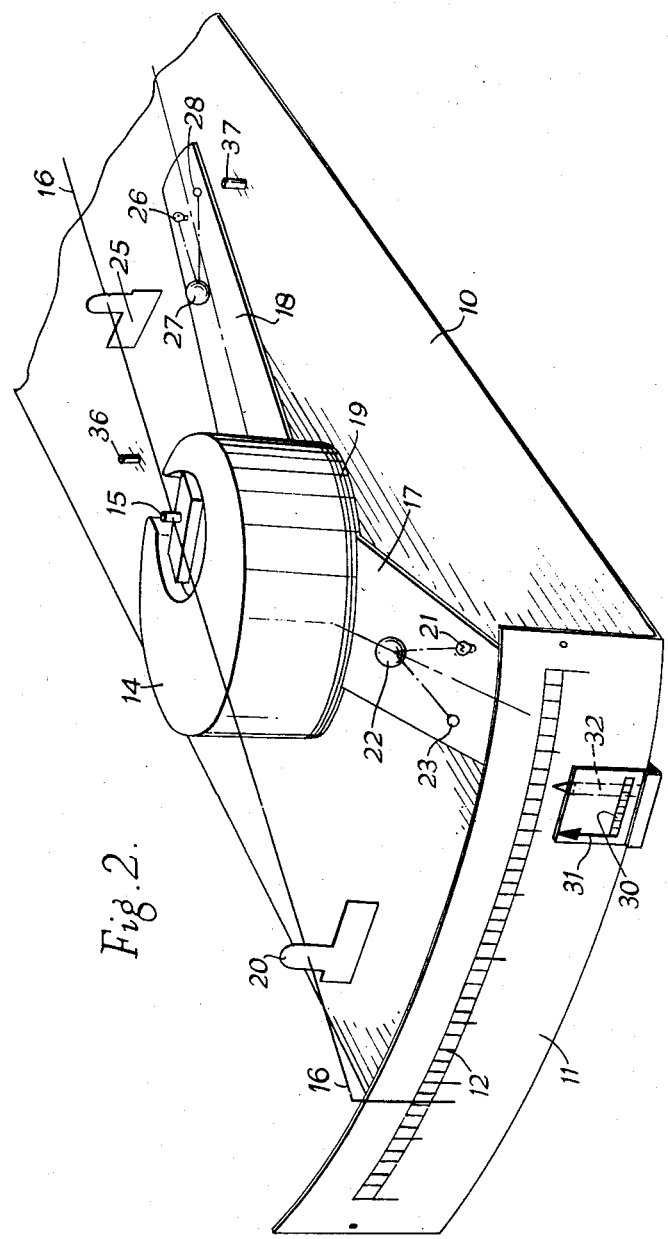

April 3, 1962
I. W. STEVENSON
CONTROL DEVICES FOR AUTOMATICALLY
CONTROLLING PHYSICAL VARIABLES
3,028,503
Filed Nov. 18, 1958
3 Sheets-Sheet 3
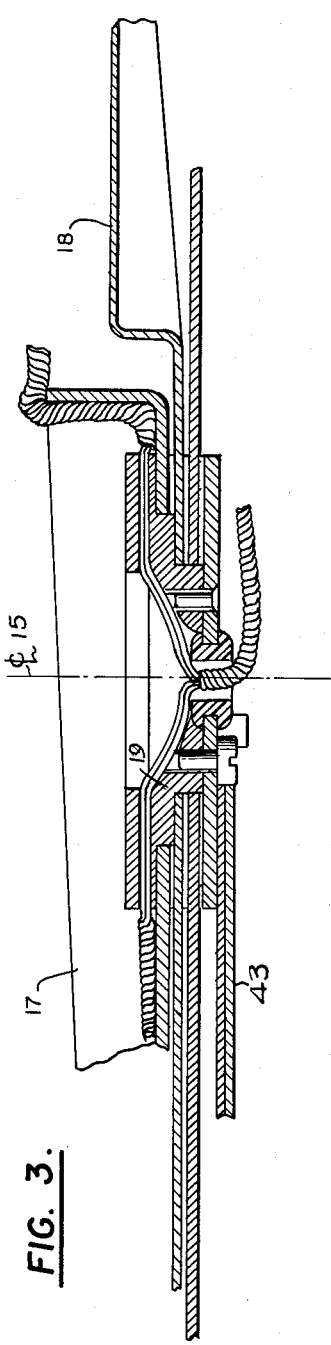
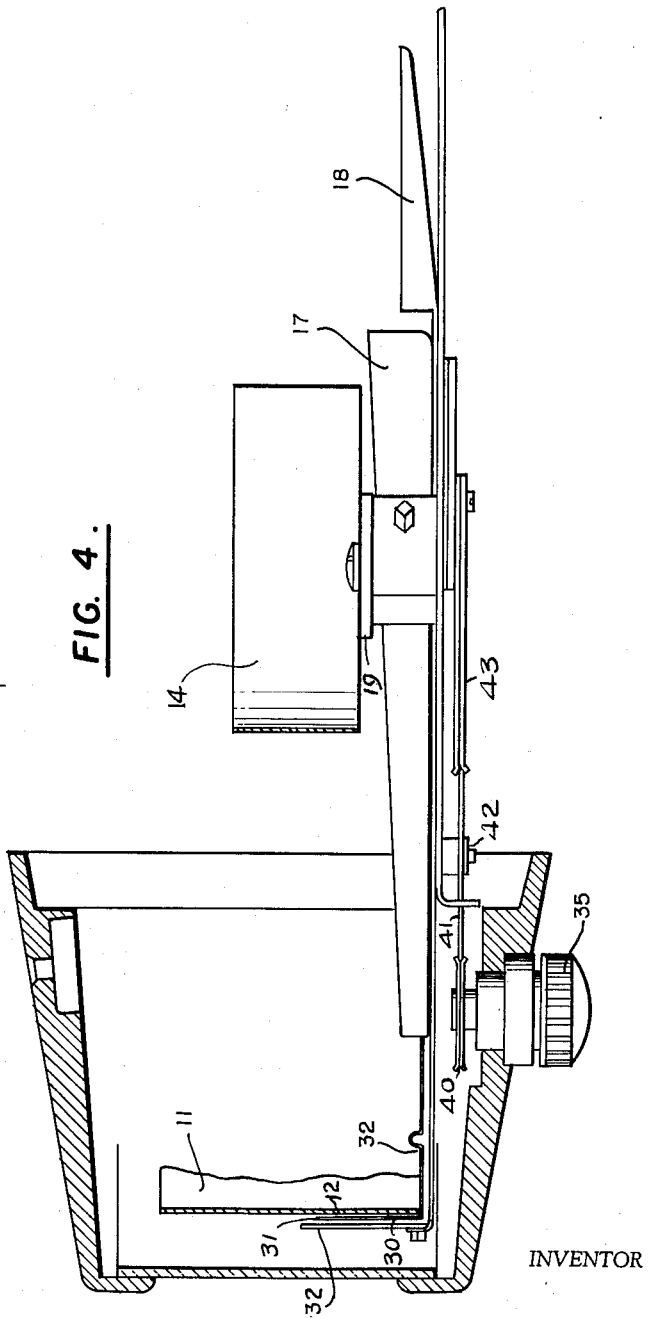
INVENTOR
Ian W. Stevenson
BY *Moore and Hall*
ATTORNEYS United States Patent Office 3,028,503
Patented Apr. 3, 1962

3,028,503
CONTROL DEVICES FOR AUTOMATICALLY CONTROLLING PHYSICAL VARIABLES
Ian W. Stevenson, % Kelvin Works, Kelvin Ave., Hillington, Glasgow SW. 2, Scotland
Filed Nov. 18, 1958, Ser. No. 774,666
6 Claims. (Cl. 250—231)

This invention relates to control devices for the automatic control of a variable, such, for example, as tempertaure, of the type wherein a member displaceable by changes in the variable to be controlled is adapted to interrupt a beam of light passing from a lamp to a photocell (or otherwise move into a position in which it produces a magnetic or electrical effect) when a predetermined value of the variable is reached thus actuating means for control of the variable. In particular, it has been known, in a system for the automatic control of the temperature of a furnace, for a pyrometer needle, displaceable in accordance with the temperature variation of the furnace, to be adapted to interrupt a beam of light passing from a light source to a photoelectric cell when a predetermined temperature is reached whereby the supply of heat to the furnace is then adjusted until a further resultant displacement of the pyrometer needle is effected to unmask the beam of light, thus restoring the original condition of heat supply.

According to the present invention the control device comprises a member displaceable by changes in the variable, a pair of arms mounted adjustably on said member, means for adjusting said arms in relation to a scale of the variable and in relation to each other two sets of control point detector means, each set having two relatively movable co-acting elements, one of said elements of one set being mounted on one of said arms while one of said elements of the other set is mounted on the other of said arms, the arrangement being such that the elements move into co-acting positions at preselected different values of the variable, said elements being associated with means for controlling said variable.

By means of the invention a three-position control is provided.

Thus in certain applications, the control devices may operate both a heater and a cooler as required. In such a case, for reasons of stability, there is advantageously a condition where neither the heater nor the cooler is in operation. The present invention provides a single control instrument to perform this operation, and the three positions would correspond to three conditions; for example, one in which the heater is on, one in which neither the heater nor the cooler is on, and one in which the cooler is on.

In another example, it may be required to control at one temperature for a specified time, after the elapse of which control is effected at a second temperature.

The invention will now be described by way of example with reference to the accompanying diagrammatic drawings, wherein:

FIGURE 2 is a perspective view of the device with its casing removed.

FIGURE 3 is fragmentary section taken through the center lines of arms 17 and 18 of FIGURE 2.

FIGURE 4 is a side elevation with some parts eliminated and some parts in section to show arrangement for setting arms 17 and 18 of FIGURE 2.

Figure 1:
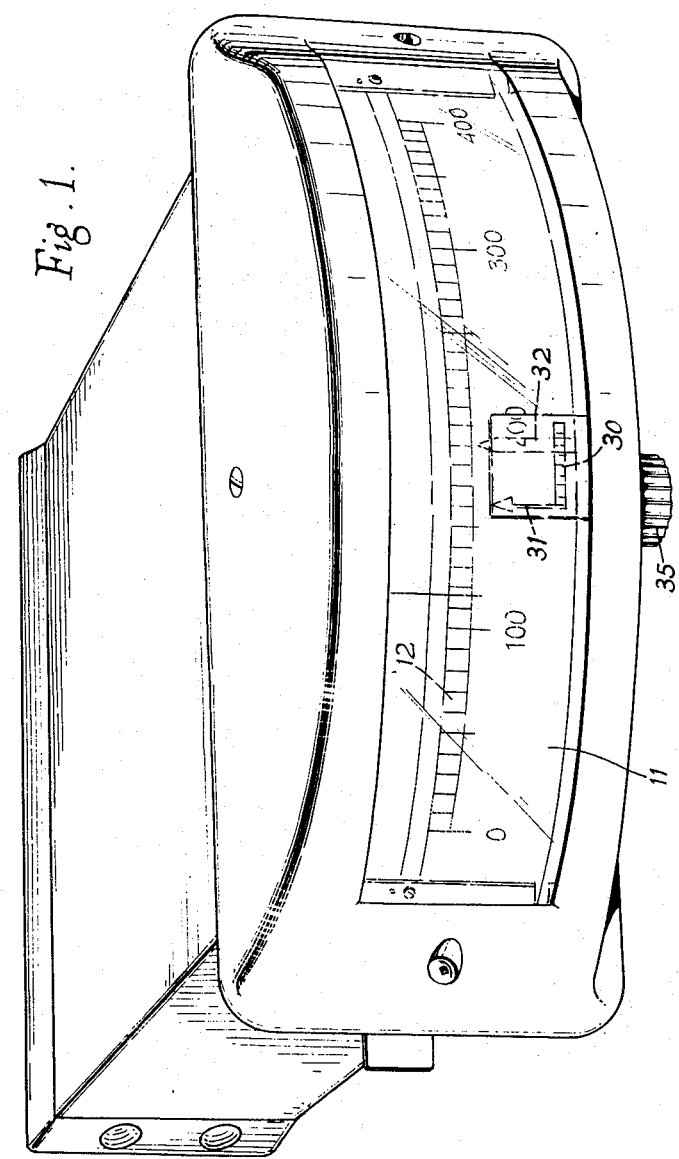
FIGURE 1 is a perspective view of a control device made in accordance with the present invention.

The instrument comprises a base plate 10 having a front curved scale plate 11 carrying a scale 12 graduated in values of the variable to be measured.

The condition of the variable is detected and measured by means of a sensitive moving coil galvanometer 14 mounted on the base plate 10. The moving coil galvanometer 14 has a moving coil assembly 15 which is magnetically suspended to restore the effects of shock and vibration. The assembly 15 carries a pointer 16 which is adapted at one end to move over the scale plate 11 to indicate the instantaneous value of the variable. The pointer 16 carries vane elements 20 and 25, each of which works in conjunction with a control unit to be described later.

Control carrying arms 17 and 18 are mounted on the base plate 10, rotatably around the axis of the galvanometer 14. The control arm 17 carries a control unit comprising a lamp element 21, a mirror 22 and a photocell 23 and control arm 18 carries a control unit comprising a lamp element 26, a mirror 27 and a photocell 28.

The control arms 17 and 18 are held together by a friction disc 19 and may be moved together over the full scale range by means of a slow motion friction drive operated by an external control setting knob 35 (FIGURE 1).

The drive between setting knob 35 and control arms 17 and 18 comprises a front friction wheel 40, an intermediate friction wheel 41 pivoted at 42 and a rear friction wheel or arm 43.

Control arm 17 carries a control pointer 31 and control arm 18 carries a control pointer 32. These control pointers 31 and 32 cooperate with the temperature scale 12 to show the position of the control arms 17 and 18 relative to the scale 12. Control pointer 31 forms part of a small sub-scale 30 also carried by control arm 17 and control pointer 32 is arranged so that it may move over the sub-scale 30. The sub-scale 30 may be marked in units of percentage of the main scale.

When the arms 17, 18 are moved by means of the external setting knob 35 to the extreme ends of the scale 12, the arm 18 makes contact respectively with stops 36, 37 provided at positions corresponding to the ends of the scale. As the arm 18 is held only in frictional engagement with the arm 17, continued rotation of the external setting knob 35 causes the arm 17 to move whilst the arm 18 is held stationary against the stop. In this way the separation between the two arms may be altered. The external setting knob 35 is then once again adjusted so that the control pointer 31 takes up a position at any desired point on the scale 12.

As the value of the variable changes, the pointer 16 moves over the scale 12 and the vane elements 20 and 25 cooperate in turn respectively with the control units carried by the arms 17 and 18 thus enabling control to be effected at two pre-selected values of the variable.

Where the control device described is used in an electric furnace that has three-phase heater windings, the furnace can be rapidly brought up to the desired temperature with the windings in "delta" connection. When the lower control position is reached, the first photocell 23 and lamp 21 as a unit can be arranged to operate a switch fixing the windings to "star" connection, thereby reducing the rate of heating. When the higher control position is reached, it may be arranged that the heater is switched off altogether by means of the second photocell 28 and lamp 26 as a unit.

For most applications of the invention it is preferred to use semi-conductor crystal photocells at 23 and 28 and other transistor-type photocells, which are relatively small, capable of passing enough current to operate a relay without amplification and relatively insensitive to changes in applied voltage, has enabled many of these disadvantages to be overcome.

It is to be understood that the lamp and photocell units 21, 23 and 26, 28 may be provided with the refinements described in our co-pending British Patent Nos. 813,277 and 821,552, both filed in 1956, in order to effect sharper control and/or to give an extended temperature scale.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

As one example of the above, the vanes 20 and 25 instead of cutting off light to a photocell may move into a position in which one of them alters the reactance between coils in an electrical oscillatory circuit to cause the latter to oscillate or to stop oscillating, this effect being used to control the variable.

I claim:

1. A control device for the automatic control of a variable having a member displaceable by changes in the variable, a pair of arms frictionally engaged and pivoted on said member, a scale, means for adjusting said arms in a relation to said scale, and in relation to each other, means for controlling said variable comprising two sets of control point detector means each set having two relatively movable co-acting elements mounted on opposite sides of the pivot of said pair of arms, one of said elements of one set being mounted on one of said arms while one of said elements of the other set is mounted on the other of said arms, the arrangement being such that the elements move into co-acting positions at pre-selected different values of the variable.

2. A control device as claimed in claim 1, wherein the arms carry pointers located in proximity to each other and to a scale plate that is movable over said scale.

3. A control device as claimed in claim 2, wherein said member is the movable part of a moving coil galvanometer fed with a current proportional to said variable.

4. A control device as claimed in claim 3 wherein said arms are rotatably mounted on said member with frictional engagement means between them.

5. A control device as claimed in claim 4 wherein said elements comprise radially fixed vanes mounted on opposite sides of said member and positioned for interrupting beams from lamps to photocells mounted on the arms.

6. A control device as set forth in claim 5, said photocells being transistor-type, and sub-scale means and a control pointer mounted on one of said arms and positioned adjacent said scale.

References Cited in the file of this patent

UNITED STATES PATENTS

| | | |
|---|---|---|
| 2,067,613 | McMaster | Jan. 12, 1937 |
| 2,138,593 | Breitenstein | Nov. 29, 1938 |
| 2,218,502 | Breitenstein | Oct. 22, 1940 |
| 2,249,682 | Clark | July 15, 1941 |
| 2,540,728 | Hansen et al. | Feb. 6, 1951 |